(12) United States Patent
Reilly

(10) Patent No.: US 8,510,830 B2
(45) Date of Patent: Aug. 13, 2013

(54) METHOD AND APPARATUS FOR EFFICIENT NETFLOW DATA ANALYSIS

(75) Inventor: Peter Reilly, Stillorgan (IE)

(73) Assignee: Fluke Corporation, Everett, WA (US)

( * ) Notice: Subject to any disclaimer, the term of this patent is extended or adjusted under 35 U.S.C. 154(b) by 94 days.

(21) Appl. No.: 13/221,182

(22) Filed: Aug. 30, 2011

(65) Prior Publication Data

US 2012/0311704 A1  Dec. 6, 2012

(30) Foreign Application Priority Data

Jun. 3, 2011  (EP) .................... 11168731

(51) Int. Cl.
*H04L 29/06* (2006.01)
*G06F 11/00* (2006.01)
*G06F 12/14* (2006.01)
*G06F 12/16* (2006.01)
*G08B 23/00* (2006.01)

(52) U.S. Cl.
USPC ................ 726/22; 726/23; 726/28

(58) Field of Classification Search
USPC .................. 726/22, 23, 28
See application file for complete search history.

(56) References Cited

U.S. PATENT DOCUMENTS 7,260,849 B1 * 8/2007 Frazier et al. ............... 726/28
8,001,601 B2 * 8/2011 Duffield et al. ............. 726/23

* cited by examiner

*Primary Examiner* — Shin-Hon Chen
(74) *Attorney, Agent, or Firm* — Edwards Wildman Palmer LLP; Scott D. Wofsy; Christopher J. Capelli

(57) ABSTRACT

A flow based detection system for detecting networks attacks on data networks. Flow records are collected in a novel data structure that facilitates efficient sorting. The sorted data structure can be subsequently analyzed in an efficient manner to find out if the network is under attack. An attack is identified if the numbers of unique corresponding addresses or conversations are too large.

13 Claims, 7 Drawing Sheets

| Flow Record |
|---|
| Source IP Address |
| Destination IP Address |
| Next Hop IP Address |
| Inbound IF index |
| Outbound IF index |
| Packet Count |
| Byte Count |
| Flow Start Time |
| Flow End Time |
| Source Port |
| Destination Port |
| TCP Flags |
| IP Type of Service |
| Source Autonomous ID |
| Destination Autonomous ID |
| Source Mask Bits Count |
| Destination Mask Bits Count |

Flow Record

FIG. 5

FIG. 6A
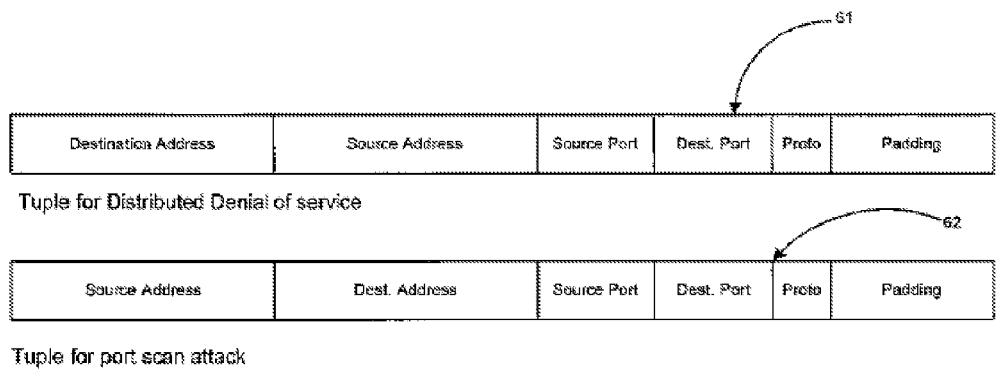
Tuple for Distributed Denial of service
Tuple for port scan attack
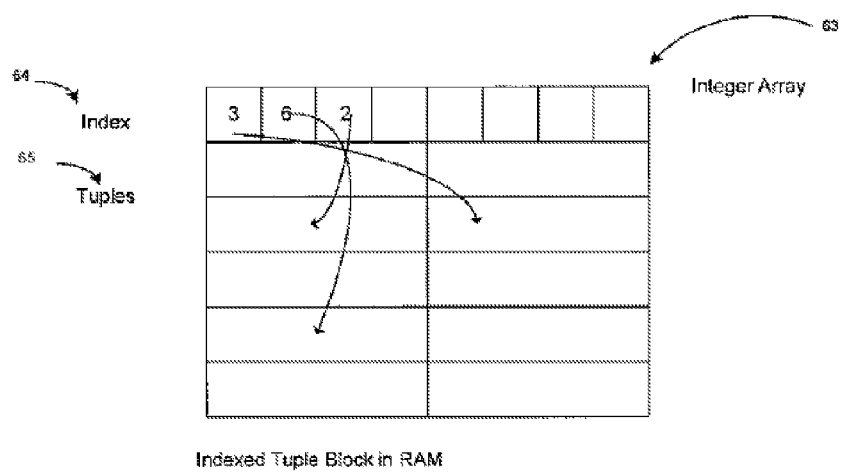
Indexed Tuple Block in RAM
FIG. 6B

METHOD AND APPARATUS FOR EFFICIENT NETFLOW DATA ANALYSIS

CROSS-REFERENCE TO RELATED APPLICATIONS

This application is a U.S. patent application that claims the benefit of priority from EP Patent Application 11168731.5, filed Jun. 3, 2011.

BACKGROUND OF THE INVENTION

1. Field of the Invention

This invention relates to network communications and usage analysis, and particularly to methods and apparatus for gathering and processing netflow data. More specifically, the exemplary embodiments of the present invention relate to identifying network attacks using flow records.

2. Background of the Invention

Packetized data networks are in widespread use transporting data throughout the world. Packetized data networks typically format data into packets for transmission between one computer and another. These packets include headers containing information relating to packet data and routing. The data networks send these packets from the originating computer to the destination computers using routers which send the packet on to the destination computer using the routing information in the packet header. A flow of packets are a group of packets sent from a particular source network address and port to a destination network address and port. These particular destination source network addresses and ports may, for example, correspond to different computers. As these networks have expanded the benefits of using them has increased. However this has opened opportunities for attacks on businesses using the networks.

One type of attack is a distributed denial of service. This involves a large number of compromised computers attacking specific computers and overwhelming them by opening huge numbers of network connections. Another type of attack is a port scanning attack. This involves a rogue computer opening connections over a range of network addresses and probing them for weaknesses.

Netflow is a known network protocol which may be used for collecting and monitoring IP traffic. Some netflow analyzing engines keep only the top number (normally up to 1000) of source, destination IP addresses based solely on the volume of data associated with the IP address. The disadvantage of filtering the information in this manner is that the actual flow information is lost, in particular the context of the resulting information e.g. the source and destination ports associated with the source and destination IP addresses. Hence, such engines are unable to identify attacks as all distribution information is lost.

Other netflow analyzing engines retain only a subset of the flows (normally around 10,000 flows in a time period of one hour). The subset is normally based on the flow octet size. This technique reduces the storage required for flows whilst, in contrast to the technique outlined above, still retaining some distribution information. However, since the subset is normally based on flow octet size, in particular the highest values thereof and denial of service and port scanning attacks can contain small amounts of octets, flows associated with the attack do not appear in the subset and so the attack would again not be visible to the engine.

In order to be able to identify the patterns of the attacks described here, it is necessary to analyze all the flows, especially flows with only a small amount of octets and packets. Such analysis is generally not undertaken due to the inefficiency thereof, i.e. it is deemed unfeasible to effectively analyze such a large volume of data as this would not only lead to issues regarding storage capacity, but also require unrealistic processing times in order to identify attacks.

It is an object of the present invention to overcome these problems by providing a technique for efficient processing and analysis of netflow data and which enables, in particular, the identification of distributed denial of service attacks and port scanning attacks based on analysis of a full set of flow information.

BRIEF SUMMARY OF THE INVENTION

Aspects of the present invention are set out in the accompanying claims.

According to one aspect of the present invention, flow collection technology is used to obtain information on connections in a data network which can also be used to identify virus attacks within a realistic timescale. This enables an operator to be able to take targeted action against such attacks by, for example, reconfiguring firewall settings to deny particular transmissions from the relevant addresses identified as being involved with the attacks, and thereby ensuring that the network is running securely and with as much bandwidth as possible.

According to an embodiment, this is achieved by:
storing information on the flows;
sorting the information specific to each of the flows in order to identify associations between particular source and destination IP addresses and ports along with the volume of transmissions between them;
then, based on the sorted information, counting these distinct source or destination addresses and conversations; and
ordering the results by the top distinct address or conversation count.

The so-called "conversations" are the transmissions between the particular source and destination IP addresses and ports which are stored and sorted by the present invention in order to establish the respective associations between them. If the conversation count is large, a high volume of traffic is demonstrated which could indicate a port scanning attack.

In a preferred embodiment, the present invention extracts the relevant information from the flow records and analyzes it for repetitive associations between particular addresses and communication patterns that may indicate that a certain type of attack is being implemented. The invention then ranks the information based on the volume of these distinct associations and patterns, thereby providing the user with real-time indication of the likelihood of a particular attack taking place.

One of the many ways that data about an object can be represented is as a "tuple". This is an ordered set of values, each of which describes some aspect of the object. Tuples in turn are stored as an indexed block data structure, such as lines in spreadsheets or rows in database tables. In one embodiment, the present invention stores the information specific to each flow record in a tuple comprising the relevant fields of the flow record. This is a convenient technique which enables facilitated sorting of large numbers of such information. In a further embodiment, the tuples are written into an integer array in a memory such as a Random Access Memory (RAM). By writing the tuple blocks to a memory in this fashion, this embodiment enables the tuple blocks to be merged and the sum of particular addresses and conversations to be determined in an easy fashion.

Arrangements embodying the invention will now be described by way of example with reference to the accompanying drawings.

BRIEF DESCRIPTION OF THE DRAWINGS

FIG. 5 is a block diagram illustrating the fields of each flow record in an exemplary embodiment of the present invention.

FIG. 6, which comprises FIGS. 6A to 6C, is a block diagram illustrating exemplary tuple and tuple block data structures in computer memory used to store information of a network connection in accordance with an embodiment of the present invention.

DETAILED DESCRIPTION OF THE INVENTION

Figure 1:
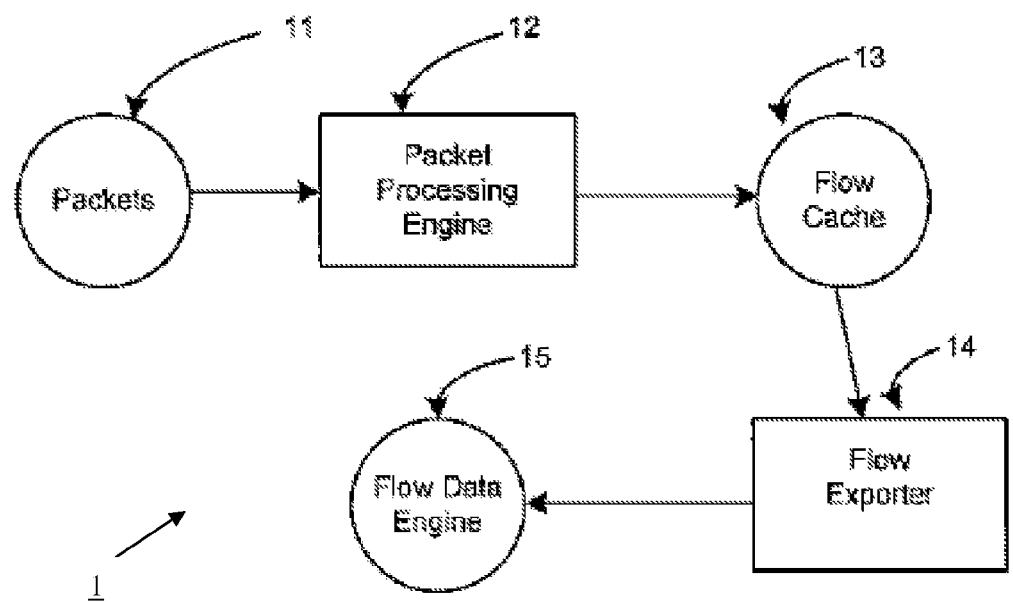
FIG. 1 is a block diagram illustrating a network routing device for processing and providing flow information in a network.

FIG. 1 shows a general block diagram of a network routing device 1 for processing received packets and collecting flow records from the network. As packets 11 are received and processed by a packet processing engine 12 of the routing device 1, information on the received packet flows is stored in a flow cache 13. At fixed time intervals, for example each minute, the flow cache 13 is flushed and the netflow information is exported by a netflow export protocol embodied as a Flow Exporter 14 and transmitted to a Flow Data Engine 15.

Figure 2:
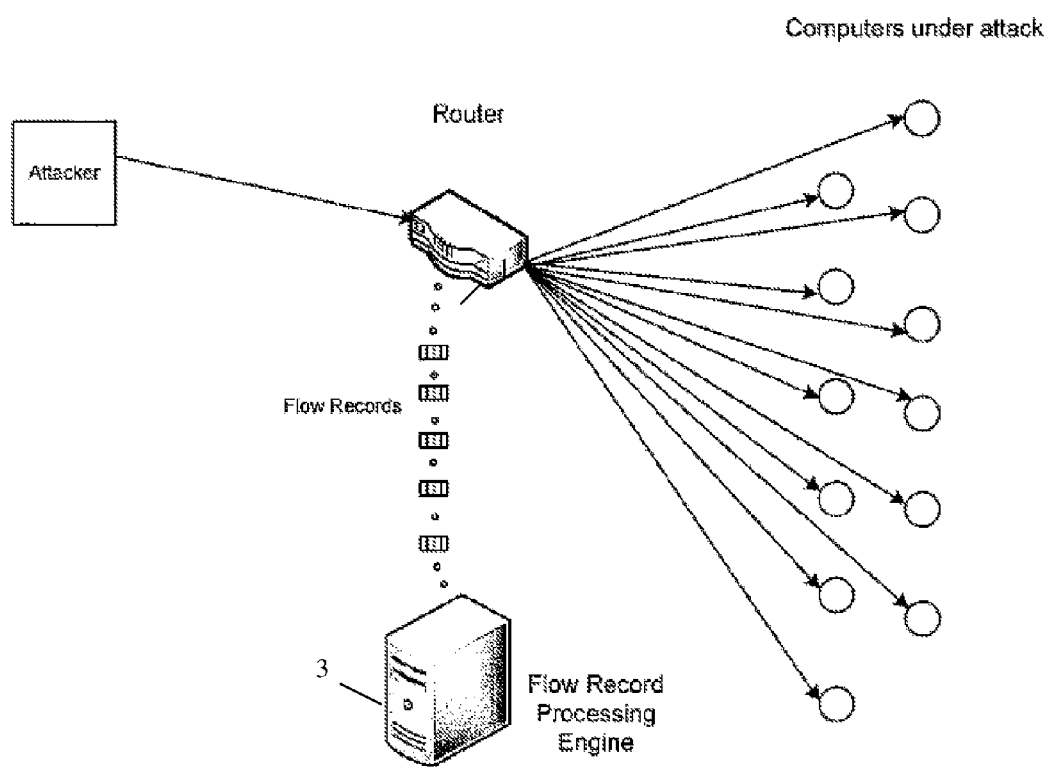
FIG. 2 is a block diagram illustrating an example of a port scanning attack that is detected by a netflow processing engine in accordance with an embodiment of the present invention.

FIG. 2 shows an example of a port scanning attack from an attacker to multiple target hosts. An attacker computer typically opens large number of connections to a range of computers. These connections are reported by the routing device 1 to the netflow processing engine 3 using flow records. The flow information for this attack would generally have one source address and a large number of associated destination addresses and ports. In other words, the attack is launched from a rogue computer having a single source address which is targeting a plurality of other hosts which have many different destination addresses and ports, all associated with the single source address.

Figure 3:
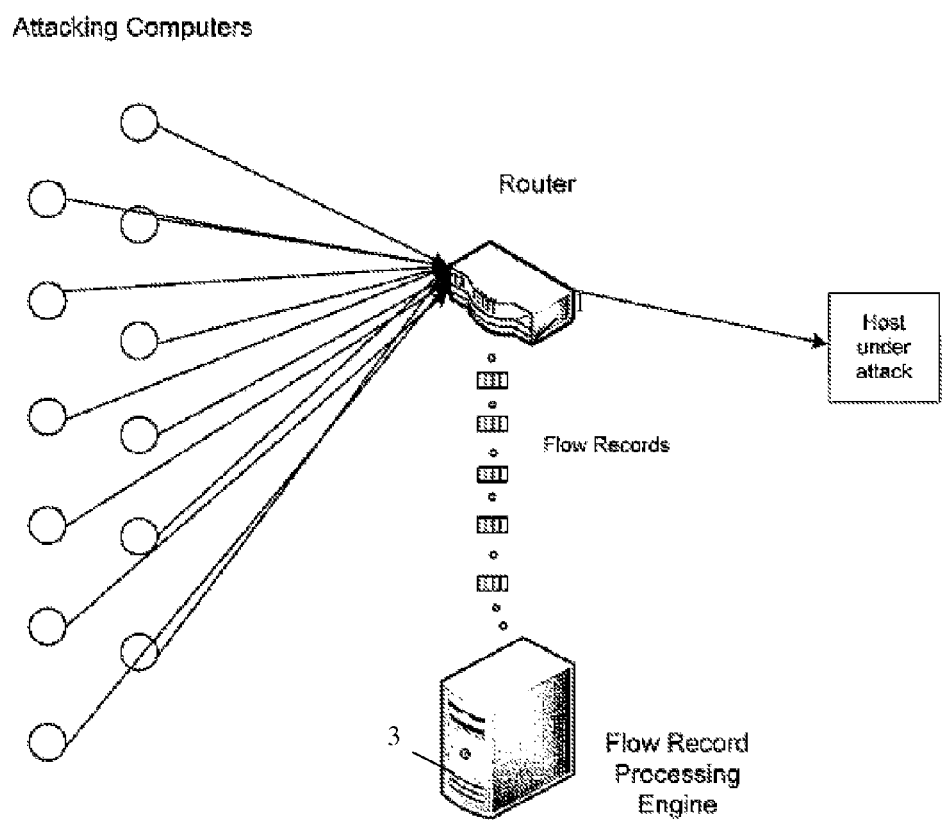
FIG. 3 is a block diagram illustrating an example of a distributed denial of service attack that is detected by a netflow processing engine in accordance with an embodiment of the present invention.

FIG. 3 shows an example of a denial of service attack which is launched from multiple computers to a single targeted host. In this example, a large number of computers typically open connections with a single computer. These connections are reported by the routing device 1 to the netflow processing engine 3 using flow records. The flow information for this attack would have one destination address corresponding to the targeted host and a large number of source addresses and ports corresponding to the multiple computers and associated with the single destination address.

The operation of processing and collecting a stream of flow records according to the present invention, to facilitate efficient subsequent analysis to identify the above forms of network attacks, will now be described with reference to FIG. 4.

Figure 4:
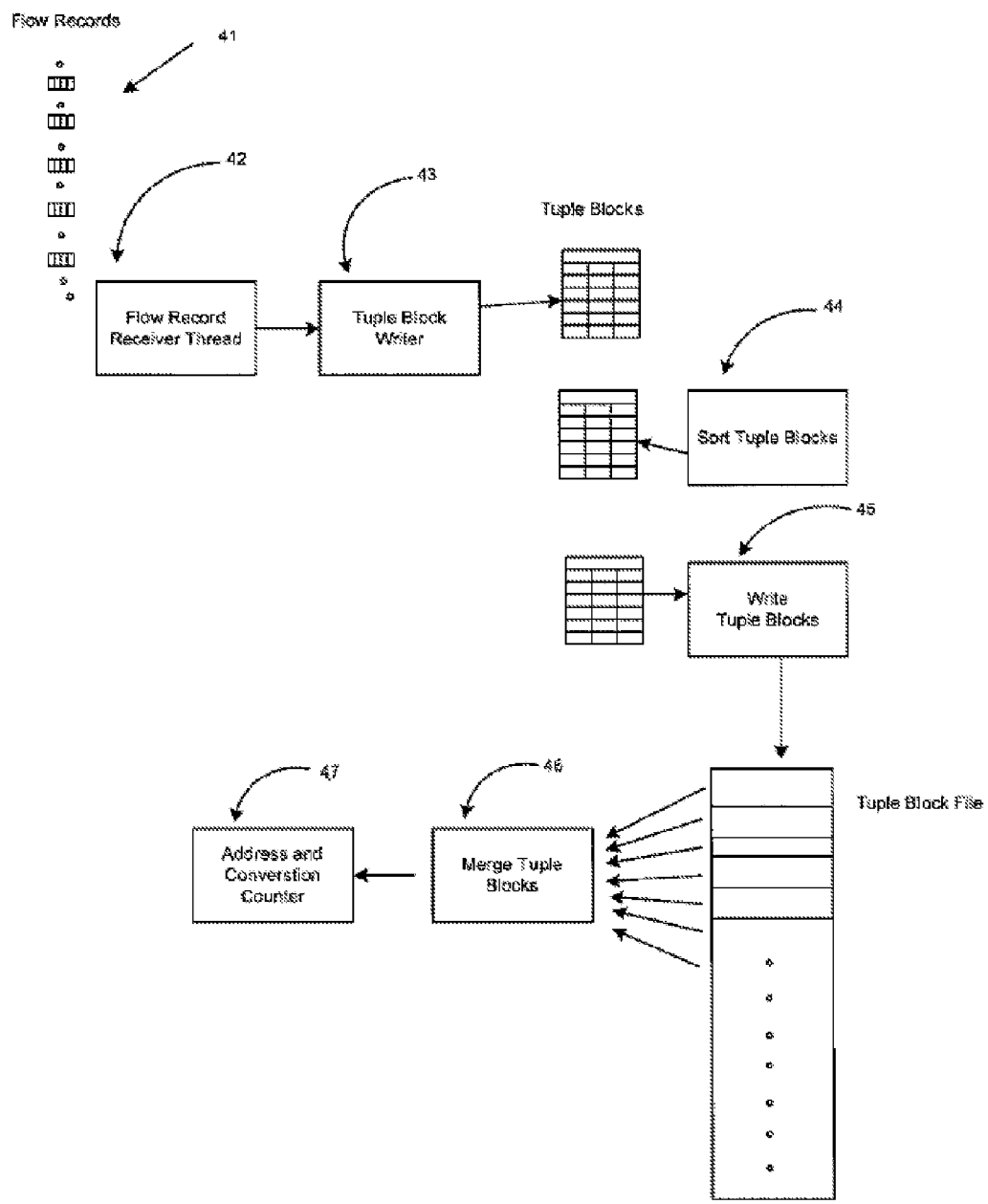
FIG. 4 is a diagram schematically illustrating functional components, data structures, and operations performed by the netflow processing engine to process a stream of network flow records in accordance with an exemplary embodiment of the present invention.

FIG. 4 is a block flow diagram schematically illustrating the operation by the functional components and data structures of the flow record processing engine 3. The process starts with receiving a plurality of flow records 41 from the routing device 1 which are processed by a Flow Record Receiver Thread 42 of the netflow processing engine 3. In this embodiment, the netflow processing engine 3 collects a plurality of flow records within a predefined time window, which could be any amount of time such as an hour or a few days.

FIG. 5 shows the contents of an exemplary flow record, containing relevant information about a flow. As shown in FIG. 5, the fields include:

Source IP address
Destination IP address
Source IP port
Destination IP port
IP protocol
Number of octets in the flow
Number of packets in the flow
Type of service
Other fields A flow record may be emitted at regular time intervals, for example each minute, by a router for each flow, so a single long lived flow would generate many flow records.

A filter for a specific query may be applied to each flow. Examples of such a filter may be flows within a certain time range or flows that match particular interfaces etc. The filter may be composed of filter parameters for any combination of fields available in a flow record. The filter parameters may be defined by values or range of values for the associated field. For example, a range of IP address values may be defined for example as a net mask, and a port range may be defined from a start value to an end value.

In this embodiment, the netflow processing engine 3 is configured as mentioned above for detection of distributed denial of service and/or port scan network attacks, and therefore collects and analyses flow records within a predetermined time window in order to efficiently identify active netflows to a particular source or destination IP address. The netflow processing engine 3 in this embodiment is configured to extract five of the above fields from the flow record to analyze the netflows, namely the source address and port, the destination address and port, and the IP protocol. These five fields will be referred to collectively as the 5-tuple conversation data. Those skilled in the art will appreciate that any other combination of fields may be used to form an N-tuple having N fields, for example to analyse the flow records for a different task or query.

The values from the respective fields of the 5-tuple conversation data are extracted from each received flow record by a Tuple Block Writer 43. In this exemplary embodiment, the extracted values are first placed into a tuple data structure as shown in FIG. 6A. The order of the fields within the tuple data structure depends on the configuration of the netflow processing engine 3. For example, for distributed denial of service detection where the netflow processing engine 3 is configured to identity active netflows to the same destination IP address, the values are written to a tuple data structure in the order 61 of: destination IP address first, then source IP address, followed by the source port, destination port and IP protocol. On the other hand, for port scan detection where the netflow processing engine 3 is configured to identity active netflows to the same source IP address, the values are written to a tuple data structure in the order 62 of: source IP address first, then destination IP address, followed by the source port, destination port and IP protocol.

The 5-tuple data structure may be of a fixed size, for example consisting of four 32-bit integer elements for processing efficiency. As shown in FIG. 6A, padding may be therefore be provided after the five fields if the associated values are less than the fixed length of the data structure.

In this embodiment, the netflow processing engine 3 is configured to extract, collect, process and output a sorted data stream of the 5-tuples from the predetermined time window. This sorted data stream is then passed to a subsequent analysis component for efficient processing. The sorting according to this embodiment is performed in two phases for both memory and processor efficiency. As the first phase, the Tuple block writer 43 outputs the generated 5-tuple data structure to an indexed tuple block data structure 63, having a predetermined size for storing a fixed number of 5-tuple data structures, until the block data structure is full. Those skilled in the art will appreciate that the indexed tuple block may be stored for example as an integer array in a RAM memory. The tuple block 63 also includes an index 64 of the relative location of each individual tuple element 65 in the tuple block 63. In the example illustrated in FIG. 6B, the index 64 is an integer array storing an integer index for each tuple element 65 as an offset in the tuple block 63.

Once the netflow processing engine 3 determines that the tuple block 63 has been filled with the maximum number of individual tuple elements 65, the tuple block 63 is sent to a tuple block sorter 44. The tuple block sorter 44 sorts the individual tuple elements 65 in a predefined order so that the sorted data structure facilitates more efficient analysis to identify distinct associations between particular source and destination IP addresses and ports, along with the volume of transmissions between them (for example based on a number of octets in the flow and/or a number of packets in the flow, from values extracted from the associated flow record). Those skilled in the art will appreciate that the sort order may be defined based on the configuration of the netflow processing engine. For example, for distributed denial of service detection where the netflow processing engine 3 is configured to identity active netflows to the same destination IP address, the tuples are sorted based on the destination IP address, which is stored as the first element in the tuple data structure 61 and can therefore be efficiently extracted for processing by the tuple block sorter 44. On the other hand, for port scan detection where the netflow processing engine 3 is configured to identity active netflows to the same source IP address, the tuples are sorted based on the source IP address, which again is stored as the first element in the tuple data structure 62 according to this configuration.

According to the present embodiment, the tuple block sorter 44 can perform an efficient sort of the individual tuple elements 65 by re-ordering the individual indices of the index 64 instead of having to extract, re-order and rewrite the tuple data itself. In other words, the tuple elements 65 themselves are not moved within the tuple block 64 during the tuple block sort; only the index positions are moved. Any identified duplicate tuple (for example where the tuples have the same source and destination addresses, ports and protocol) may also be efficiently removed from the tuple block 63 by removing the individual index for one of the duplicated tuples from the index 64.

Figure 6C:
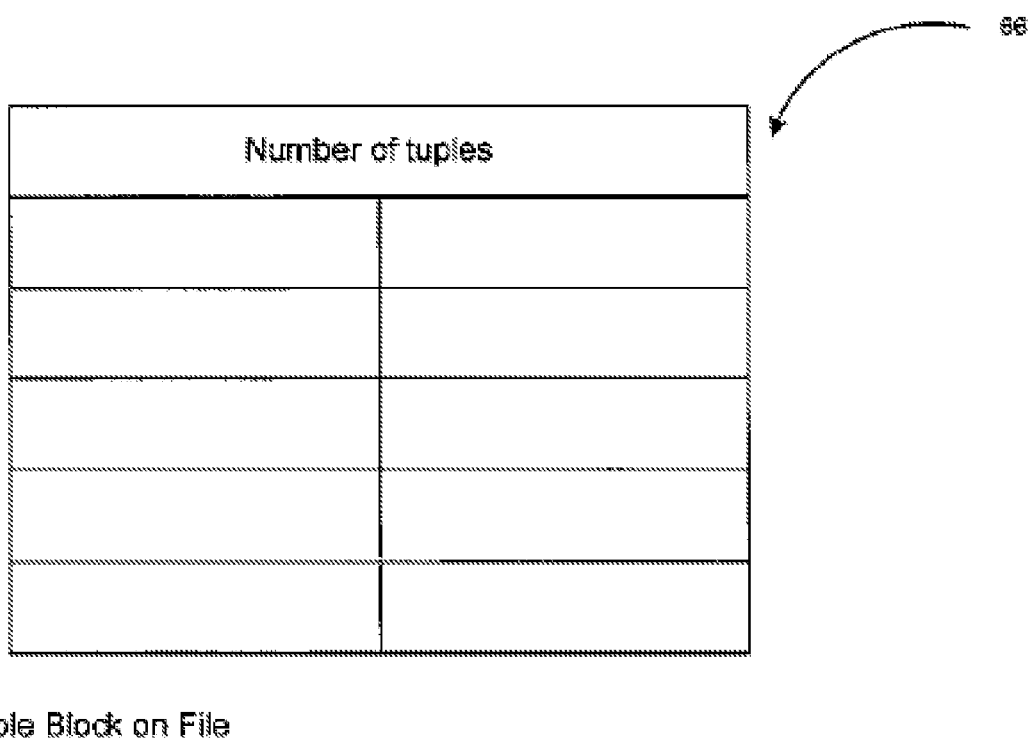

When the tuple block 63 has been sorted by the tuple block sorter 44, the sorted tuple block is sent to a tuple block writer 45 which moves the sorted tuple block 44 to an output Tuple block file 66. As shown in FIG. 6C, the generated Tuple block file 66 may include the total number of sorted individual tuple file elements as a header element. The tuple block is consequently empty and a first iteration of the first phase is completed for the predetermined time window. The tuple block writer 45 may perform additional processing to determine and prioritize the distinct source or destination addresses and conversations that are the most likely to indicate an attack.

The above described process of extracting 5-tuples, filling up the tuple block, sorting the filled tuple block and adding the sorted tuple block to the output Tuple block file is repeated for the duration of the predetermined time window.

When the netflow processing engine 3 determines that the predetermined time window has elapsed, the Tuple block file 66 is output to a merge sort component 46 which reads the tuple blocks from the tuple block file 66 and performs a merge sort of the sorted tuples. Those skilled in the art will appreciate that the merge component 46 may efficiently carry out the merge sort by keeping a pointer to each tuple block in the tuple block file, emitting the lowest tuple from the blocks and advancing that pointer.

The overall merge sorted tuples are then output by the merge sort component 46 as a sorted data stream of all of the extracted tuples from the predetermined time window, and the data stream of stored tuples is passed to an Address and Conversation Counter 47 which processes the received data stream to calculate the number of distinct associated addressees and conversations for each unique source and destination IP address pair. In this embodiment, the counter calculation can be efficiently performed on the received data stream of sorted tuples, for example using the following algorithm:

```
PerTuple:
    if tuple(0) != atuple(0):
        emit( ) incr addr_count, incr_conv_count
    Else if tuple (1) ! = atuple (1) :
        incr_addr_count, incr_conv_count
    Else if tuple != atuple
        incr_conv_count
    atuple = tuple
```

The destination IP addresses that correspond to a distributed denial of service attack would be those with the highest counts of distinct associated addresses and conversations. Similarly, the source IP addresses with the highest counts would be indicative of port scan attacker IP addresses. The address and conversation counter 47 may also be configured to identify associations between network addresses and network ports, for example by ranking the calculated counts according to the highest number of destination addresses and ports being associated with a single source address and the highest number of source addresses being associated with a single destination address.

By virtue of the aforementioned features, the present invention offers a facilitated technique for processing a large amount of flow information, thereby enabling efficient and accurate identification of a type and source of a particular network service attack.

This information may then be displayed to a user in a chart or graph format, and may indicate the results over a certain time period. Based on this information, the user or an automated system may take action to block the attack in progress. For example, firewall settings may be changed in order to block transmissions from the addresses which have been identified as being the source of the attack.

In the above description, the netflow processing engine 3 is arranged to store and execute software which controls the operation to perform the method described above. As those skilled in the art will appreciate, a computer program for configuring a programmable device to become operable to perform the above method may be stored on a carrier and loaded into memory, such as a flash memory of the system. The program may be downloaded as a signal and/or may be applied as a patch or update to software already resident on the system. The scope of the present invention includes the program, the carrier carrying the program and the broadcast signal.

Alternative Embodiments

The embodiments are described above purely by way of example, and variations may occur to the skilled person on reading the description, which nevertheless fall within the scope of the invention as defined by the claims.

For example, in the embodiments described above, the Tuple block file output by the Tuple Block Writer is merged and sent to an Address and Conversation counter for processing to calculate the number of distinct associated addressees and conversations for each unique source and destination IP address pair, so as to efficiently identify a destination IP addresses that correspond to a distributed denial of service attack and/or a source IP addresses of a port scan attacker. As those skilled in the art will appreciate, the sorted tuple block data structure can be utilized by other forms of netflow data analysis components configured to receive a sorted stream for efficient processing. For example, the sorted stream can be processed by a top N calculator as described in the Applicant's co-pending application entitled "Method and Apparatus for Streaming Netflow Data Analysis" in order to efficiently identify the top N number of netflows that meet a particular criteria because of the specific arrangement of the sorted data in the data stream.

In the embodiments described above, the netflow processing engine is configured to collect flow records within a predetermined time window. As those skilled in the art will appreciate, flow records may instead be collected according to the above described method until an output Tuple block file of a predefined fixed size is full.

In the embodiments described above, the network addresses are IP addresses. Those skilled in the art will appreciate that the embodiments of the present invention are applicable to any other forms of network addressing.

Embodiments of the present invention may be implemented using hardware, software or a combination thereof and may be implemented in one or more computing systems or other processing systems.

The invention claimed is:

1. An apparatus for collecting netflow data comprising:
a processor adapted to execute one or more processes; and
a memory configured to store a process executable by the processor, the process when executed operable to:
receive, via the apparatus, a plurality of flow records from at least one network device, each flow record having at least a source Internet Protocol (IP) address and a destination IP address;
extract, via the apparatus, data from the received flow records into a block data structure, wherein the block data structure includes a plurality of individual elements each storing extracted data including the source IP address and the destination IP address from a respective flow record, and an index of each of the plurality of individual elements;
sort, via the apparatus, the individual elements in the block data structure by re-ordering the index of each of the plurality of individual elements; and
process, via the apparatus, the block data structure as a data stream according to the stored individual elements to identify a pattern of network usage based on a number of flow records indicating at least a same IP address or destination IP address.

2. The apparatus of claim 1, wherein the block data structure has a fixed size and wherein the process, when executed, is further operable to determine when the block data structure is full before sorting the individual elements in the block data structure.

3. The apparatus of claim 2, wherein the process, when executed to sort the individual elements in the block data structure, is further operable to sort the individual elements based on bit patterns of the extracted data.

4. The apparatus of claim 3, wherein the process, when executed to sort the individual elements in the block data structure, is further operable to add the sorted block data structure to an output block file.

5. The apparatus of claim 4, wherein the process, when executed to receive the plurality of flow records, is further operable to receive a plurality of flow records within a predetermined time window.

6. The apparatus of claim 5, wherein the process, when executed is further operable to:
repeatedly extract data from the received flow records into the block data structure and sort the individuals elements in the block data structure to fill the block data structure, sort the filled block data structure, and add the sorted block structure to the block file for the plurality of flow records within the predetermined time window.

7. The apparatus of claim 6, wherein the process, when executed, is further operable to perform a merge sort of the plurality of elements in the block file and to output a data stream of the sorted elements.

8. The apparatus of claim 1, wherein the individual elements are N-tuples, where N is a number of data entities extracted from a flow record, and wherein the block data structure is a tuple block.

9. The apparatus of claim 8, wherein the index comprises an array of indices each identifying a location of a respective individual N-tuple in the tuple block.

10. The apparatus of claim 9, wherein the process, when executed, is further operable to identify an association between network addresses and network ports of the flow records; and to identify one or more flow records that are indicative of a distributed denial of service and/or port scanning attacks based on the identified association.

11. The apparatus of claim 10, wherein the process, when executed, is further operable to identify an association by ranking the determined results according to the highest number of destination network addresses and network ports being associated with a single source network address, and the highest number of source network addresses and network ports being associated with a single destination network address.

12. The apparatus of claim 11, wherein the process, when executed, is further operable to output the ranked information.

13. A tangible, non-transitory, computer-readable media having software encoded thereon, the software, when executed by a processor, operable to:
receive a plurality of flow records from at least one network device, each flow record having at least a source Internet Protocol (IP) address and a destination IP address;
extract data from the received flow records into a block data structure, wherein the block data structure includes a plurality of individual elements each storing extracted data including the source IP address and the destination IP address from a respective flow record and an index of each of the plurality of individual elements;
sort the individual elements in the block data structure by re-ordering the index of each of the plurality of individual elements; and
process the block data structure as a data stream according to the sorted individual elements to identity a pattern of network usage based on a number of flow records indicating at least a same source IP address or destination IP address.

* * * * *

UNITED STATES PATENT AND TRADEMARK OFFICE
CERTIFICATE OF CORRECTION

PATENT NO. : 8,510,830 B2
APPLICATION NO. : 13/221182
DATED : August 13, 2013
INVENTOR(S) : Peter Reilly Page 1 of 1

It is certified that error appears in the above-identified patent and that said Letters Patent is hereby corrected as shown below:

In the Claims

At Column 7, Claim Number 1, Line Number 67, change "stored" to --sorted--.

Signed and Sealed this
Fifteenth Day of October, 2013

Teresa Stanek Rea
*Deputy Director of the United States Patent and Trademark Office*